(12) United States Patent
Agarwal et al.

(10) Patent No.: US 10,540,638 B2
(45) Date of Patent: Jan. 21, 2020

(54) TRANSFERRING CONTEXT WITH DELEGATION AUTHORITY

(71) Applicant: International Business Machines Corporation, Armonk, NY (US)

(72) Inventors: Arvind Agarwal, Bangalore (IN); Arun Kumar, Bangalore (IN); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/603,924

(22) Filed: May 24, 2017

(65) Prior Publication Data

US 2018/0341927 A1    Nov. 29, 2018

(51) Int. Cl.
*G06Q 10/10* (2012.01)
*G06Q 10/06* (2012.01)
*H04L 29/08* (2006.01)

(52) U.S. Cl.
CPC . *G06Q 10/1097* (2013.01); *G06Q 10/063112* (2013.01); *H04L 67/18* (2013.01)

(58) Field of Classification Search
CPC .......... G06F 2221/2145; G06Q 10/109; G06Q 10/1095; G06Q 10/10; G06Q 10/1093; G06Q 10/06311
See application file for complete search history.

(56) References Cited

U.S. PATENT DOCUMENTS

| 7,430,519 B2 * | 9/2008 | Thompson ..... G06Q 10/063112 705/7.14 |
| 7,483,893 B2 * | 1/2009 | McVeigh ............ G06F 16/2471 |
| 7,594,112 B2 * | 9/2009 | Patrick ................ G06F 21/6218 713/150 |

(Continued)

FOREIGN PATENT DOCUMENTS

WO    2011012640 A2    2/2011

OTHER PUBLICATIONS

Maddix, Nicholas, A Comparison of Text Importing Tools for Users of Palm Compatible PDAs Anagram, Textual, 2001 (Year: 2001).*

(Continued)

*Primary Examiner* — Scott L Jarrett
(74) *Attorney, Agent, or Firm* — Ryan, Mason & Lewis, LLP

(57) ABSTRACT

Methods, systems, and computer program products for transferring context with delegation are provided herein. A computer-implemented method includes detecting an anticipated unavailability of a first individual for a given future event, based on inputs generated by the first individual and databases of stored calendar information pertaining to the first individual and the given future event; identifying tasks, related to the given future event, requiring a delegation as a result of the anticipated unavailability of the first individual, wherein identifying is based on data related to the given future event; determining additional individuals to whom the tasks can be delegated, based on qualifications of the addi- (Continued)

tional individuals and one or more constraints; generating a summary of the delegation comprising a description of the tasks and information pertaining to the given future event; and outputting the summary to at least one of the additional individuals.

17 Claims, 6 Drawing Sheets

(56) References Cited

U.S. PATENT DOCUMENTS

| | | | |
|---|---|---|---|
| 7,644,432 B2* | 1/2010 | Patrick | H04L 63/20 713/150 |
| 7,752,205 B2* | 7/2010 | McVeigh | G06F 16/93 707/736 |
| 7,774,601 B2* | 8/2010 | Devgan | G06F 21/6218 713/166 |
| 8,332,917 B2* | 12/2012 | Forster | G06F 21/41 726/3 |
| 8,387,117 B2* | 2/2013 | Eom | G06F 21/6218 707/781 |
| 8,831,966 B2* | 9/2014 | Griffin | G06F 21/6218 705/1.1 |
| 8,832,774 B2* | 9/2014 | Nestler | G06F 21/6218 726/1 |
| 8,958,535 B2 | 2/2015 | Colbert | |
| 10,122,757 B1* | 11/2018 | Kruse | H04L 63/20 |
| 2004/0161080 A1* | 8/2004 | Digate | H04L 29/06 379/88.17 |
| 2004/0205134 A1* | 10/2004 | Digate | G06Q 10/10 709/206 |
| 2004/0243677 A1 | 12/2004 | Curbow et al. | |
| 2005/0188030 A1 | 8/2005 | Hudecek | |
| 2006/0047657 A1* | 3/2006 | Frieder | G06F 21/6218 |
| 2006/0062367 A1* | 3/2006 | Christenson | G06Q 10/1095 379/202.01 |
| 2006/0224478 A1* | 10/2006 | Harbison | G06Q 10/00 705/32 |
| 2006/0230137 A1* | 10/2006 | Gare | G06Q 10/10 709/224 |
| 2007/0174104 A1* | 7/2007 | O'Sullivan | G06Q 10/063116 705/7.21 |
| 2007/0239509 A1* | 10/2007 | Kaminsky | G06Q 10/06 705/7.18 |
| 2008/0109517 A1* | 5/2008 | Sarkar | G06Q 10/109 709/206 |
| 2008/0127231 A1* | 5/2008 | Shaffer | G06Q 10/109 719/328 |
| 2008/0195448 A1* | 8/2008 | May | G06Q 10/109 705/7.18 |
| 2008/0313004 A1* | 12/2008 | Ryan | G06Q 10/063116 705/7.17 |
| 2009/0055234 A1 | 2/2009 | Li et al. | |
| 2009/0064280 A1* | 3/2009 | Babeanu | G06Q 10/06 726/3 |
| 2009/0094083 A1* | 4/2009 | Denner | G06Q 10/06 705/7.19 |
| 2009/0222747 A1* | 9/2009 | May | G06Q 10/109 715/764 |
| 2009/0319926 A1* | 12/2009 | Chakra | G06Q 10/109 715/764 |
| 2010/0083134 A1* | 4/2010 | Gnech | G06Q 10/109 715/753 |
| 2010/0235212 A1 | 9/2010 | Godfrey et al. | |
| 2012/0117161 A1* | 5/2012 | Best | G06Q 10/107 709/206 |
| 2012/0226514 A1* | 9/2012 | Patel | G06Q 10/109 705/7.19 |
| 2013/0339077 A1* | 12/2013 | Maresh | G06Q 10/06 705/7.19 |
| 2014/0075492 A1* | 3/2014 | Kapadia | H04L 63/102 726/1 |
| 2014/0075518 A1* | 3/2014 | D'Souza | H04L 63/00 726/4 |
| 2014/0280962 A1* | 9/2014 | Schultz | H04L 67/1074 709/226 |
| 2014/0310608 A1* | 10/2014 | Snyder | G06F 3/04842 715/738 |
| 2015/0149232 A1* | 5/2015 | Dietz | G06Q 10/1095 705/7.19 |
| 2015/0254518 A1* | 9/2015 | Griffin | H04M 1/72552 382/229 |
| 2016/0371655 A1* | 12/2016 | Cheng | G06Q 10/1095 |
| 2016/0379175 A1* | 12/2016 | Bhattacharya | G06Q 10/1097 705/7.21 |
| 2017/0003845 A1* | 1/2017 | Karsten | G06F 19/3418 |
| 2017/0200128 A1* | 7/2017 | Kumahara | G06Q 10/1095 |
| 2018/0101760 A1* | 4/2018 | Nelson | G06N 3/006 |
| 2018/0129645 A1* | 5/2018 | Grant | G06F 17/279 |

OTHER PUBLICATIONS

Jung, Kangsoo et al., Context Awae Role Based Access Control Using User Relationship International Journal of Computer Theory and Engineering, vol. 5, No. 3, Jun. 2013 (Year: 2013).*
Bettaz, Ourada et al., Dynamic delegation based on temporal context Procedia Computer Science, vol. 26, 2016 (Year: 2016).*
GetAnagram.com Web Pages Anagram, 2007 (Year: 2007).*
Gaaloul, Khaled et al., Injecting Task Delegation Constraints into a Role-based Access Control Model The First Workshop on Alignment of Business Process and Security modeling, Sep. 2011 (Year: 2011).*
Na, Sang Yeob et al., Role Delegation in Role Based Access Control RBAC2000, ACM, 2000 (Year: 2000).*
Bertino, Elsa et al., TRBAC: A Temporal Role Based Access Control Model ACM Transactions on Information and System Security, vol. 4, No. 3, Aug. 2001 (Year: 2001).*
Le, Xuan Hung et al., An enhancement of the Role-Based Access Control model to facilitate information access management in context of team collaboration and workflow, Journal of Biomedical Informatics, vol. 45, 2012 (Year: 2012).*
Oh, Sejong et al., Task-role based access control model Information Systems, vol. 28, 2003 (Year: 2003).*
Zhou, Wei et al., Team and Task Based RBAC Access Control Model IEEE, 2007 (Year: 2007).*
Lech, P., Knowledge Transfer Procedures From Consultants to Users in ERP Implementations, Electronic Journal of Knowledge Management vol. 9 Issue 4 2011.
Smith, E. A., The Role of Tacit and Explicit Knowledges in the Workplace, Journal of Knowledge Management, vol. 5, No. 4, 2001, pp. 311-321.

* cited by examiner

TRANSFERRING CONTEXT WITH DELEGATION AUTHORITY

FIELD

The present application generally relates to information technology, and, more particularly, to resource management techniques.

BACKGROUND

It often happens that a critical resource is unavailable for an event due to other engagements and/or scheduled/unscheduled leaves. Given that the calendars of multiple people may need to be matched, it can be inefficient or implausible to reschedule the event. Delegation of work to an alternate person can potentially help in such situations. However, existing scheduling management approaches can only enable explicit specification of a delegate who is determined through an offline channel. Further, such existing approaches do not provide any support for identifying an appropriate delegate or for enabling the delegate to be prepared to take on the delegated responsibility. For example, the delegate may need access to required resources to be ready for the event/task. Also, there may be sensitive details involved in the process that need to be masked or that prevent the delegate from being chosen for the task.

SUMMARY

In one embodiment of the present invention, techniques for transferring context with delegation authority are provided. An exemplary computer-implemented method can include steps of detecting an anticipated unavailability of a first individual for a given future event, based on inputs generated by the first individual and databases of stored calendar information pertaining to the first individual and the given future event; identifying tasks, related to the given future event, requiring a delegation as a result of the anticipated unavailability of the first individual, wherein identifying is based on data related to the given future event; determining additional individuals to whom the tasks can be delegated, based on qualifications of the additional individuals and one or more constraints; generating a summary of the delegation comprising a description of the tasks and information pertaining to the given future event; and outputting the summary to at least one of the additional individuals.

In another embodiment of the invention, an exemplary computer-implemented method can also include steps of automatically identifying one or more resources required for carrying out the one or more tasks; automatically determining a second individual to whom the one or more tasks can be delegated, wherein determining is based on (i) qualifications of the additional individuals and (ii) one or more constraints; automatically masking, from the second individual, any sensitive content contained within the identified resources; automatically outputting the summary to the second individual; and subsequent to masking, temporarily allocating access to the identified resources to the second individual.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
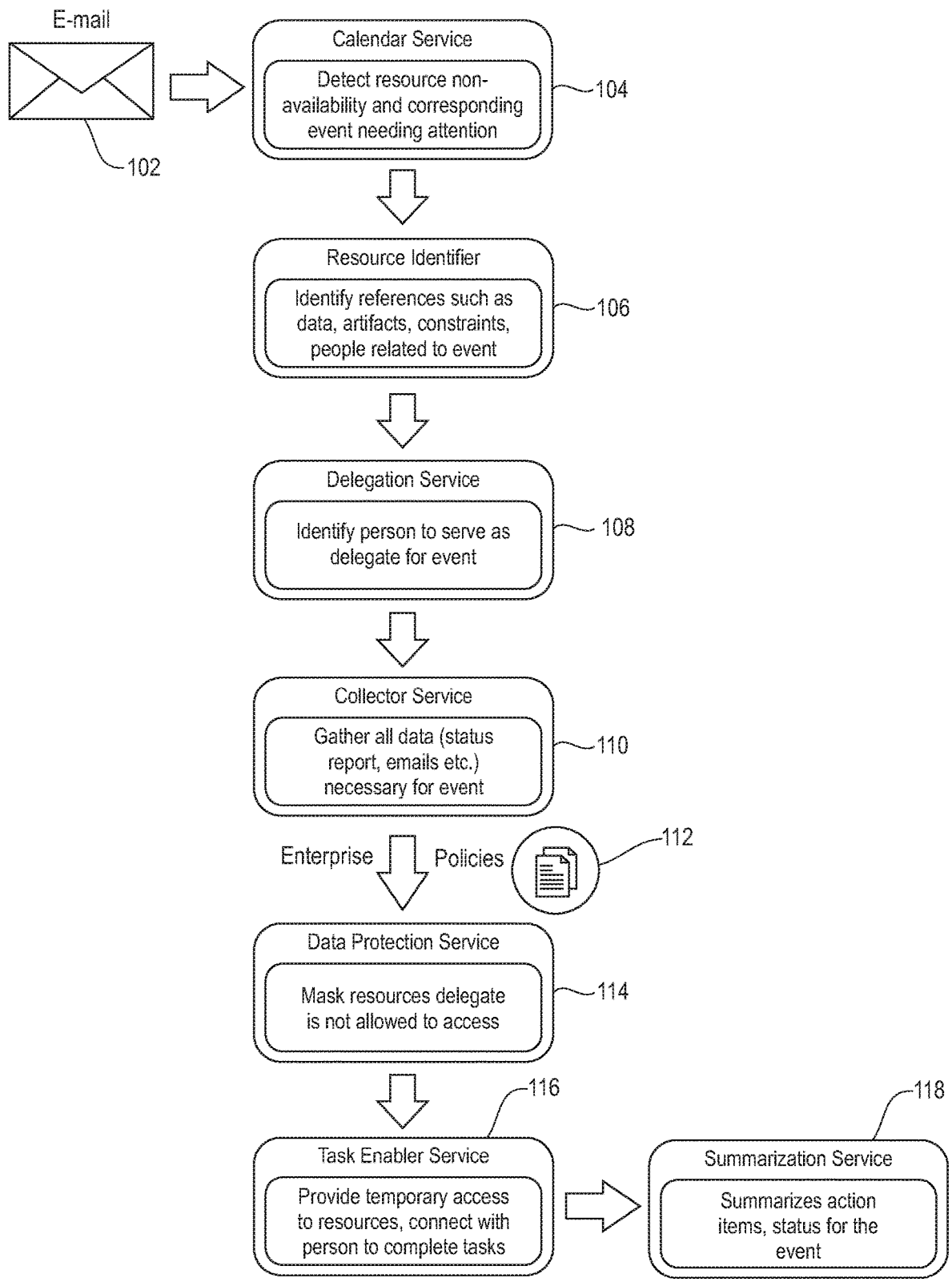
FIG. 1 is a diagram illustrating system architecture, according to an embodiment of the invention.

As described herein, an embodiment of the present invention includes transferring context with delegation. At least one embodiment of the invention includes generating and/or implementing a cognitive system for identifying a suitable delegate to represent an unavailable individual in a scheduled meeting or event. Such an embodiment can also include preparing the delegate for replacing the unavailable individual by transferring relevant context/information and delegation authority, as well as generating a summary of actionable items and the time required to complete the actions, using information identified from various resources such as calendar applications, e-mail content, etc. Accordingly, such an embodiment can also include identifying necessary participants for the given meeting or event, and if any participant is not available, identifying one or more tasks that needs to be covered by a delegate.

At least one embodiment of the invention can include identifying an e-mail thread with content that shares one or more similarities with a given event. Email threads can be identified, for example, based on similarity in the titles and/or similarity in the content, as well as based on explicit continuation hints such as forward or response signifiers. Such content can include, for example, a carbon copy (CC) list, the event name, the event topic, etc. Additionally, such an embodiment can include forwarding any identified thread to a delegate, and generating a summary of one or more event tasks based on the identified thread. Summaries can be generated by extracting the task-related text from the entire thread chain. For example, an original thread might contain a task such as "Update on draft summary by Friday every week." Therefore, emails would be tracked for an update on this task, and a summary could be generated as the original task and the latest update against this task.

As detailed herein, one or more embodiments of the invention can also include identifying one or more tasks of the original invitee (that is, the invitee that is to be replaced by the delegate) for the event. For example, consider an email directed to the invitee stating "Update on draft by Friday every week." Portions of the sentence can be classified as "facts," "statements," "tasks," etc., by learning based on previous emails. Such tasks can include tasks to be done before the meeting and/or tasks to be discussed or carried out during the meeting. Additionally, such an embodiment can also include identifying one or more relevant emails sent by the original invitee (pertaining to the event and/or one of the event-related tasks) and forwarding such emails to the delegate so that the delegate can follow-up and/or take any necessary action.

At least one embodiment of the invention can also include identifying any resources necessary for carrying out the pending tasks, and temporarily allocating access to such resources to the delegate. Also, such an embodiment can include determining, and providing to the delegate, an estimation of the time required to complete the pending tasks. In one or more embodiments of the invention, an actionable task is associated with a time. If not explicitly provided, an estimation of time can be assumed to be the time until the next meeting between the participants.

Further, at least one embodiment of the invention can include identifying any sensitive content in any identified email threads, masking such content from the delegate, and informing the sender about the sensitive content, enabling the sender to decide whether the delegate can receive the content. Certain content in an email thread can be deemed sensitive by learning from past annotated data wherein email content has been explicitly tagged as sensitive or otherwise noted by subject matter experts. Also, certain organizational rules can designate certain types of content as sensitive.

FIG. 1 is a diagram illustrating system architecture, according to an embodiment of the invention. By way of illustration, FIG. 1 depicts a calendar service component 104, which detects resource non-availability and a corresponding event needing attention (for example, in the form of a delegate). Inputs are analyzed by component 104 via processing of email content 102, and correlating such content with a calendar schedule (for example, an email indicating upcoming travel during the time period of a local conference talk). In one or more embodiments of the invention, the calendar service component 104 can process the email content 102 for words and phrases indicating (anticipated) travel, leave, etc., along with applicable dates. Such dates and times can then be correlated with calendar data (for one or more relevant individuals) to identify any potential conflicts. Further, the calendar service component 104 can take into account clashing events in the calendar and events in another geographic region or time zone.

The potential conflicts identified and output by calendar service component 104 are then utilized by resource identifier 106 to identify any resources that need to be delegated, in connection with one or more events included in the noted conflicts. The resource identifier 106 can, for each event noted in the potential conflicts, analyze the calendar event description, a list of involved participants, and any related email or other communication to classify the event into one or more event categories. Example categories can include a customer meeting, an internal group meeting, a design session, a press release, a code review, a product launch, etc.

In one or more embodiments of the invention, the resource identifier 106 can also determine a minimum set of requirements for completion of each noted event. Such requirements can be obtained and/or inferred from event invitations, event agenda communications, and/or emails pertaining to the event. In at least one embodiment of the invention, unless mentioned, all observed or inferred requirements are mandatory. Further, in one or more embodiments of the invention, the resource identifier 106 can interact with an estimated efforts database to determine an estimated amount of time and/or effort required to carry out tasks similar to one or more tasks of each noted event.

FIG. 1 also depicts a delegation service component 108, which identifies one or more individuals to who the tasks of each noted event can be delegated. The delegation service component 108 can consider resource access in the delegation determination. Additionally, a potential delegate should satisfy constraints associated with the tasks. Such constraints can include, for example, a time constraint (availability for the event, time to ramp-up, time to perform action items, etc.), permissions to relevant tools and/or data, capability to perform tasks, prior experience, on-going work, etc.

Also, FIG. 1 depicts a collector service component 110, which collects email communications, project status reports, code repositories, and/or non-email communications (and other shared resources) relevant to the tasks of each noted event. Using such collected information, at least one embodiment of the invention includes identifying one or more communication threads that are related to the event (identified via a CC list, event name, event topic, etc.) and forwarding such threads to the identified delegate. Additionally, such an embodiment can include identifying, and highlighting within the threads, any task for the original invitee for a given event.

Based on the collected and identified information output by collector service component 110, as well as one or more enterprise policies 112 (directed to sensitive information, security, confidentiality, etc.), a data protection service component 114 can mask all resource access that the delegate is not allowed to access. For example, the data protection component 114 identifies any sensitive content in the output threads and masks the sensitive content. Also, one or more embodiments of the invention can include informing the sender (of the particular communication thread in question) about the sensitive content, and enabling the sender to decide whether the delegate can be granted access to the content.

Based on any access decisions determined by component 114, a task enabler service component 116 can provide temporary access to certain resources to a delegate (in order to complete one or more tasks associated with a given event). Additionally, FIG. 1 depicts a summarization service component 118, which generates and provides, to the delegate, a summary of the tasks specific to the original invitee (that is, the individual being replaced/represented by the delegate). In one or more embodiments of the invention, the summary can also be provided to the event organizer and/or one or more key event participants. The summarization service component 118 can transfer any access-approved data (such as a status report, presentation materials, etc.) to the delegate, along with instructions related thereto.

Figure 2:
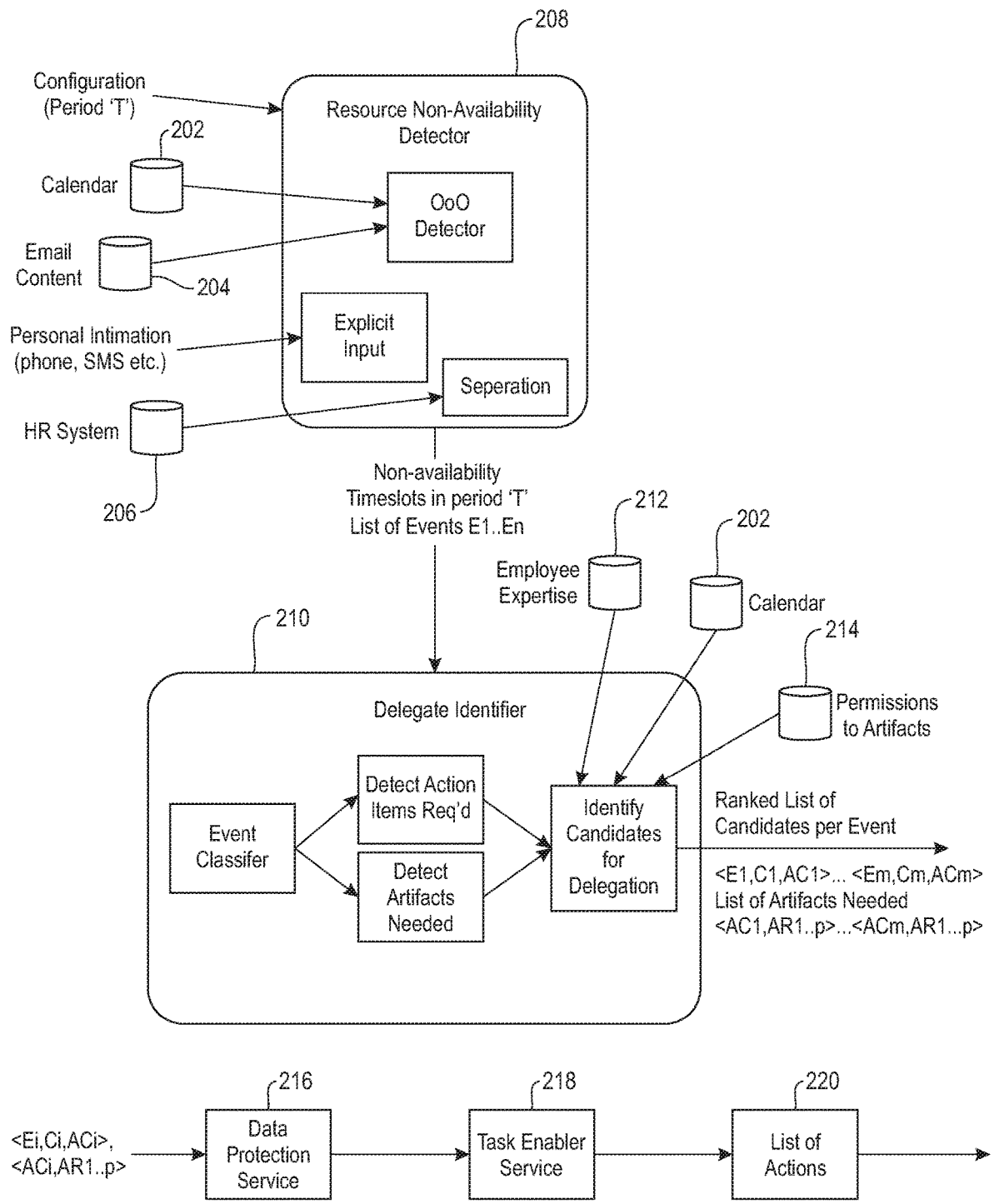
FIG. 2 is a diagram illustrating system architecture, according to an exemplary embodiment of the invention.

FIG. 2 is a diagram illustrating system architecture, according to an embodiment of the invention. By way of illustration, FIG. 2 depicts data sources that can be used to detect resource non-availability for a task and/or event. Such data sources can include a calendar database 202 (which includes upcoming events, event invitation content, event participants list, event agenda information, event venue information, etc.), an email content database 204 (which can include and/or indicate requests for leave, tentative or confirmed plans for travel, email content pertaining to a calendar event and related action items and owners listed therein, etc.), and a human resources (HR) system database 206. The HR system database 206 can contain, for example, employee absence data. Based on data from such sources, as well as additional information such as configuration data (for time period "T") and personal intimations (phone messages, short message service (SMS) messages, etc.), a resource non-availability detector 208 can detect and generate a list of one or more unavailable resources (which can include people) across one or more time slots in time period T, as well as a list of one or more events ($E_1, \ldots E_n$) during the one or more time slots in time period T.

Based on the list of unavailable resources and the list of one or more events, a delegate identifier 210 can identify one or more individuals suitable to serve as a delegate/replacement for a given unavailable resource for a given one of the events. FIG. 2 also depicts data sources that can be used to identify a person suitable for a given delegate role. The delegate identifier 210 can analyze the calendar event description (from calendar database 202), involved participants and any related email or other communication, as well as travel time for various individuals to various event venues, to classify the event/task into one or more event categories (as detailed herein). Additionally, the delegate identifier 210 can identify action items required in preparation for the event, as well as identify data, artifacts, and/or constraints required for the action items.

The above-noted data sources analyzed by the delegate identifier 210 can also include an employee expertise database 212, which includes information pertaining to the experience and capabilities of multiple individuals/employees. Such information can include resumes, profile pages, individual home pages, published papers, prior completed projects, similar event experience, job descriptions, etc. The data sources can also include permissions to artifacts 214, which can include information indicating which individuals are authorized to access which items of data. Such information can include server access lists, database access lists, repository access lists, software installations, hardware installations, etc.

The delegate identifier 210 can also analyze data sources for identifying and providing access to the resources required for the task. Such data sources can include email content (to identify required resources, for example), project team identifications (to identify resources attached to the project team), a source code repository, enterprise communication channels (such as a wiki, one or more communities, project management tools, team rooms, shared folders, etc.), task/event status information, software resources, hardware resources, etc.

Based on the above-noted data analysis, the delegate identifier 210 can output a ranked list of candidates per event ($<E_1, C_1, AC_1>, \ldots <E_m, C_m, AC_m>$) as well as a list of artifacts needed to carry out the task/event ($<AC_1, AR_1, \ldots p>, \ldots <AC_m, AR_1, \ldots p>$. As used above, "C" represents the candidate resource that can be picked for delegation, "AC" represents artifact constraints, which include any restriction on the artifacts associated with the task. Additionally, "AR" represents artifact resources, which include the artifacts that are associated with the resource or has access to the resource. Also, "p" represents permission, which indicates whether the resource has permission to the artifacts AR based on the constraints identified AC. These generated outputs can then be provided to a data protection service 216, which can mask all resource content that the delegate is not allowed to access. Based on any actions taken by the data protection service 216, a task enabler service 218 can enable and/or grant temporary access for certain resources to one or more delegates. Subsequently, a list of action items (related to the given task/event) can be generated and provided to the delegate.

Figure 3:
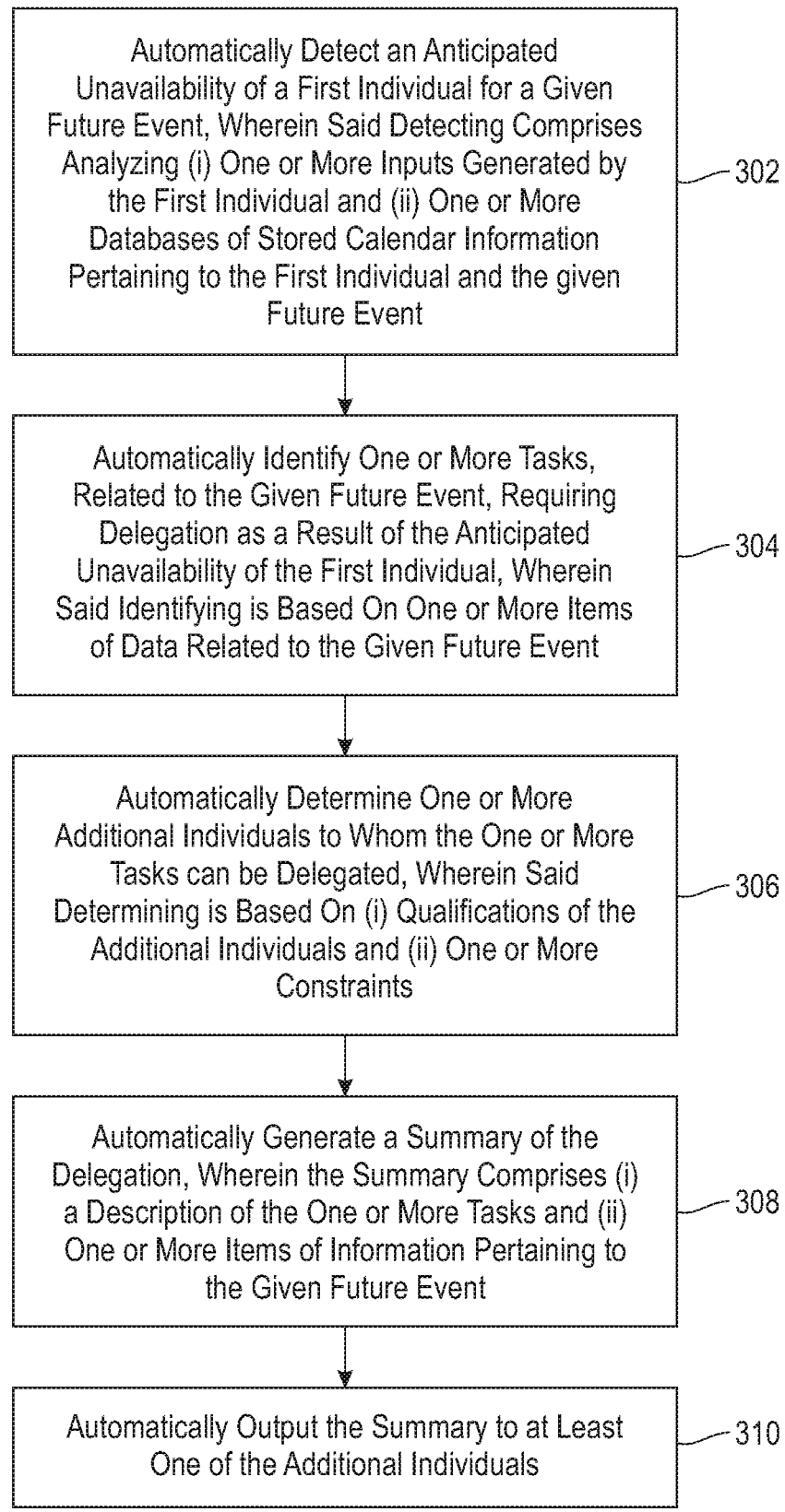
FIG. 3 is a flow diagram illustrating techniques according to an embodiment of the invention.

FIG. 3 is a flow diagram illustrating techniques according to an embodiment of the present invention. Step 302 includes automatically detecting an anticipated unavailability of a first individual for a given future event, wherein said detecting comprises analyzing (i) one or more inputs generated by the first individual and (ii) one or more databases of stored calendar information pertaining to the first individual and the given future event. The one or more inputs generated by the first individual can include one or more items of email content. The stored calendar information pertaining to the given future event can include a description of the given future event, a list of participants associated with the given future event, and/or communication content pertaining to the given future event.

Analyzing can include processing the one or more inputs generated by the first individual for one or more words indicating a potential temporal conflict with the given future event. Additionally, analyzing can include processing the stored calendar information for one or more entries indicating a potential temporal conflict with the given future event.

Step 304 includes automatically identifying one or more tasks, related to the given future event, requiring a delegation as a result of the anticipated unavailability of the first individual, wherein said identifying is based on one or more items of data related to the given future event.

Step 306 includes automatically determining one or more additional individuals to whom the one or more tasks can be delegated, wherein said determining is based on (i) qualifications of the additional individuals and (ii) one or more constraints. The qualifications of the additional individuals can include prior experience of the additional individuals, geographic proximity of the additional individuals at the time of the given future event, and/or availability of the additional individuals for the given future event. Also, the one or more constraints can include one or more access constraints with respect to one or more resources and/or one or more temporal constraints. At least one embodiment of the invention can additionally include providing, to the at least one additional individual, permission to access the one or more resources in response to the one or more access constraints.

Step 308 includes automatically generating a summary of the delegation, wherein the summary comprises (i) a description of the one or more tasks and (ii) one or more items of information pertaining to the given future event. Step 310 includes automatically outputting the summary to at least one of the additional individuals.

The techniques depicted in FIG. 3 can also include determining one or more goals of the given future event based on the stored calendar information pertaining to the given future event, as well as classifying the given future event into one or more event categories based on the one or more determined goals.

Also, an additional embodiment of the invention includes automatically identifying one or more resources required for carrying out the one or more tasks, and automatically determining a second individual to whom the one or more tasks can be delegated, wherein determining is based on (i) qualifications of the additional individuals and (ii) one or more constraints. Such an embodiment can also include automatically masking, from the second individual, any sensitive content contained within the identified resources, automatically outputting the summary to the second individual, and subsequent to masking, temporarily allocating access to the identified resources to the second individual.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives resource availability information and event information sent from a data source to the transmission server. The server can process the information, for example, based upon user-provided user preference information that is stored in memory on the server. Subsequently, an alert is generated containing delegate information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
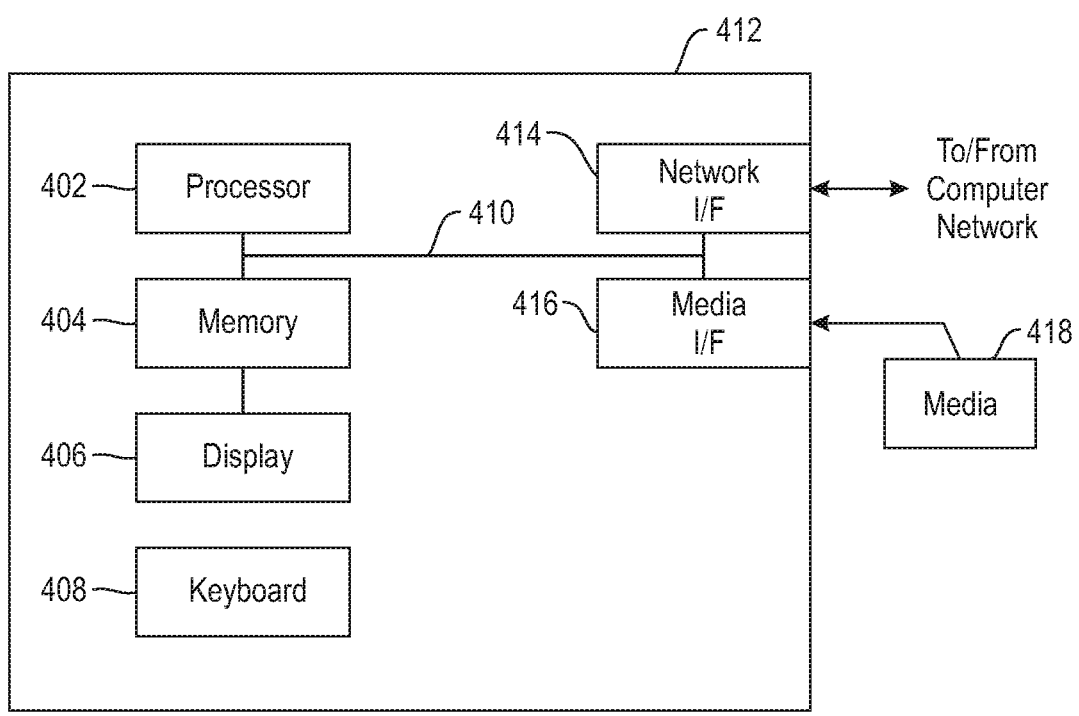
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
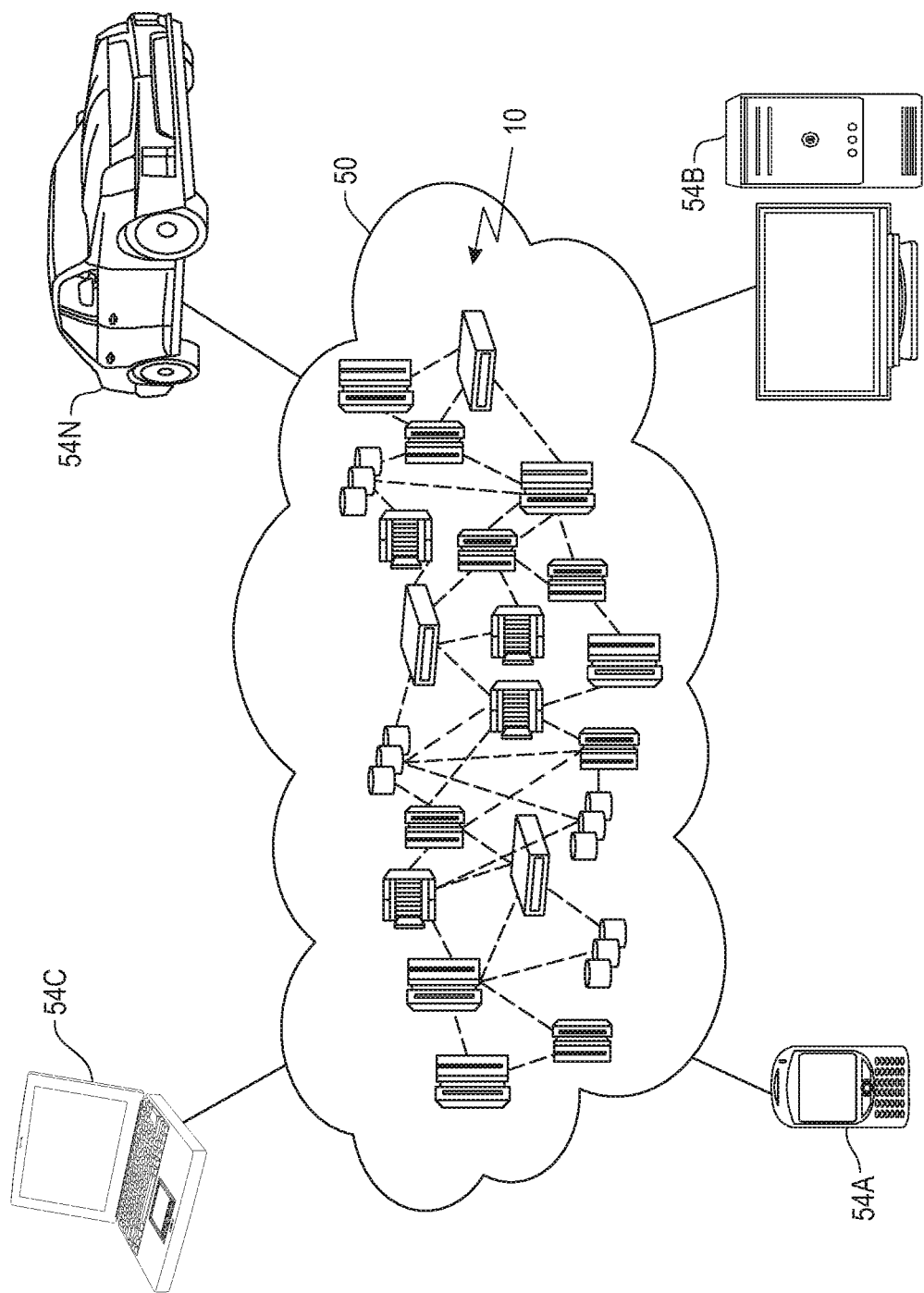
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
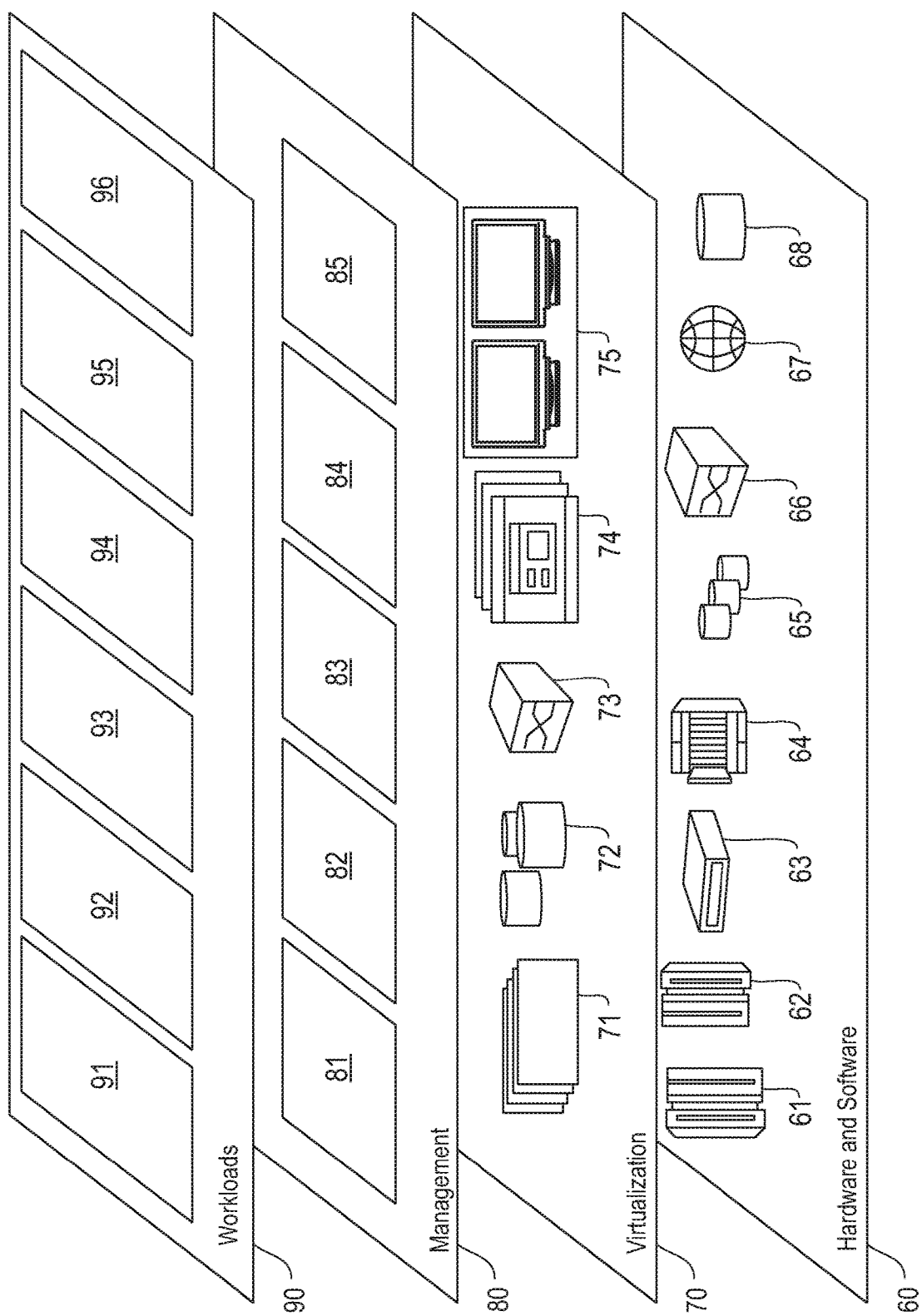
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delegation authorization and context transference 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, preparing an alternative delegate for replacing an unavailable individual for a given event by transferring relevant context/information and delegation authority, as well as generating a summary of actionable items and the time required to complete the actions, using information identified from various resources such as calendar applications, e-mail content, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising steps of:

automatically detecting, via a calendar service application, an anticipated unavailability of a first individual for a given future event, wherein said detecting comprises analyzing (i) one or more inputs generated by the first individual and (ii) one or more databases of stored calendar information pertaining to the first individual and the given future event;

automatically identifying one or more tasks, related to the given future event, requiring a delegation as a result of the anticipated unavailability of the first individual, wherein said identifying is based on one or more items of data related to the given future event;

automatically identifying, via an automated collector service mechanism, one or more resources required for carrying out the one or more tasks by analyzing data sources comprising (i) email content, (ii) one or more source code repositories, (iii) one or more communication channels, (iv) status information pertaining to the one or more identified tasks, (v) one or more software resources, and (vi) one or more hardware resources;

automatically determining, via a delegation service mechanism, one or more additional individuals to whom the one or more tasks can be delegated, wherein said determining is based on (i) qualifications of the additional individuals and (ii) one or more constraints with respect to the one or more identified resources;

automatically generating a ranked list of the one or more additional individuals as delegation candidates for the given future event, wherein the ranked list comprises identification of permissions, for accessing one or more artifacts, as determined in an automated fashion by a data protection algorithm, attributed to each of the one or more additional individuals;

automatically masking, from at least one of the additional individuals, any sensitive content contained within the identified resources, wherein said automatically masking comprises automatically applying one or more enterprise security-related policies pertaining to the identified resources in conjunction with automatically analyzing, via the data protection algorithm, (i) content within the identified resources and (ii) enterprise-related information pertaining to the at least one individual;

automatically generating, based at least in part on the ranked list, a summary of the delegation, wherein the summary comprises (i) a description of the one or more tasks and (ii) one or more items of information pertaining to the given future event;

automatically outputting the summary to the at least one individual; and subsequent to said masking and said automatically outputting the summary, temporarily allocating digital access to the identified resources to the at least one individual via a task enabler service mechanism;
wherein the steps are carried out by at least one computing device.

2. The computer-implemented method of claim 1, wherein said analyzing comprises processing the one or more inputs generated by the first individual for one or more words indicating a potential temporal conflict with the given future event.

3. The computer-implemented method of claim 1, wherein said analyzing comprises processing the stored calendar information for one or more entries indicating a potential temporal conflict with the given future event.

4. The computer-implemented method of claim 1, wherein the one or more inputs generated by the first individual comprises one or more items of email content.

5. The computer-implemented method of claim 1, wherein the stored calendar information pertaining to the given future event comprises a description of the given future event.

6. The computer-implemented method of claim 1, wherein the stored calendar information pertaining to the given future event comprises a list of participants associated with the given future event.

7. The computer-implemented method of claim 1, wherein the stored calendar information pertaining to the given future event comprises communication content pertaining to the given future event.

8. The computer-implemented method of claim 1, comprising:
providing, to the at least one additional individual, permission to access the one or more resources in response to the one or more access constraints.

9. The computer-implemented method of claim 1, wherein the one or more constraints comprises one or more temporal constraints.

10. The computer-implemented method of claim 1, wherein the qualifications of the additional individuals comprise prior experience of the additional individuals.

11. The computer-implemented method of claim 1, wherein the qualifications of the additional individuals comprise geographic proximity of the additional individuals at the time of the given future event.

12. The computer-implemented method of claim 1, wherein the qualifications of the additional individuals comprise availability of the additional individuals for the given future event.

13. A computer program product comprising a computer readable storage medium having program instructions embodied therewith, the program instructions executable by a device to cause the device to:
automatically detect, via a calendar service application, an anticipated unavailability of a first individual for a given future event, wherein said detecting comprises analyzing (i) one or more inputs generated by the first individual and (ii) one or more databases of stored calendar information pertaining to the first individual and the given future event;
automatically identify one or more tasks, related to the given future event, requiring a delegation as a result of the anticipated unavailability of the first individual, wherein said identifying is based on one or more items of data related to the given future event;
automatically identify, via an automated collector service mechanism, one or more resources required for carrying out the one or more tasks by analyzing data sources comprising (i) email content, (ii) one or more source code repositories, (iii) one or more communication channels, (iv) status information pertaining to the one or more identified tasks, (v) one or more software resources, and (vi) one or more hardware resources;
automatically determine, via a delegation service mechanism, one or more additional individuals to whom the one or more tasks can be delegated, wherein said determining is based on (i) qualifications of the additional individuals and (ii) one or more constraints with respect to the one or more identified resources;
automatically generate a ranked list of the one or more additional individuals as delegation candidates for the given future event, wherein the ranked list comprises identification of permissions, for accessing one or more artifacts, as determined in an automated fashion by a data protection algorithm, attributed to each of the one or more additional individuals;
automatically mask, from at least one of the additional individuals, any sensitive content contained within the identified resources, wherein said automatically masking comprises automatically applying one or more enterprise security-related policies pertaining to the identified resources in conjunction with automatically analyzing, via the data protection algorithm, (i) content within the identified resources and (ii) enterprise-related information pertaining to the at least one individual;
automatically generate, based at least in part on the ranked list, a summary of the delegation, wherein the summary comprises (i) a description of the one or more tasks and (ii) one or more items of information pertaining to the given future event;
automatically output the summary to the at least one individual; and
subsequent to said masking and said automatically outputting the summary, temporarily allocate digital access to the identified resources to the at least one individual via a task enabler service mechanism.

14. A system comprising:
a memory; and
at least one processor operably coupled to the memory and configured for:
automatically detecting, via a calendar service application, an anticipated unavailability of a first individual for a given future event, wherein said detecting comprises analyzing (i) one or more inputs generated by the first individual and (ii) one or more databases of stored calendar information pertaining to the first individual and the given future event;
automatically identifying one or more tasks, related to the given future event, requiring a delegation as a result of the anticipated unavailability of the first individual, wherein said identifying is based on one or more items of data related to the given future event;
automatically identifying, via an automated collector service mechanism, one or more resources required for carrying out the one or more tasks by analyzing data sources comprising (i) email content, (ii) one or more source code repositories, (iii) one or more communication channels, (iv) status information pertaining to the one or more identified tasks, (v) one or more software resources, and (vi) one or more hardware resources;

automatically determining, via a delegation service mechanism, one or more additional individuals to whom the one or more tasks can be delegated, wherein said determining is based on (i) qualifications of the additional individuals and (ii) one or more constraints with respect to the one or more identified resources;

automatically generating a ranked list of the one or more additional individuals as delegation candidates for the given future event, wherein the ranked list comprises identification of permissions, for accessing one or more artifacts, as determined in an automated fashion by a data protection algorithm, attributed to each of the one or more additional individuals;

automatically masking, from at least one of the additional individuals, any sensitive content contained within the identified resources, wherein said automatically masking comprises automatically applying one or more enterprise security-related policies pertaining to the identified resources in conjunction with automatically analyzing, via the data protection algorithm, (i) content within the identified resources and (ii) enterprise-related information pertaining to the at least one individual;

automatically generating, based at least in part on the ranked list, a summary of the delegation, wherein the summary comprises (i) a description of the one or more tasks and (ii) one or more items of information pertaining to the given future event;

automatically outputting the summary to the at least one individual; and subsequent to said masking and said automatically outputting the summary, temporarily allocating digital access to the identified resources to the at least one individual via a task enabler service mechanism.

15. A computer-implemented method comprising steps of:

automatically detecting, via a calendar service application, an anticipated unavailability of a first individual for a given future event, wherein said detecting comprises analyzing (i) one or more inputs generated by the first individual and (ii) one or more databases of stored calendar information pertaining to the first individual and the given future event;

automatically identifying one or more tasks, related to the given future event, requiring a delegation as a result of the anticipated unavailability of the first individual, wherein said identifying is based on one or more items of data related to the given future event;

automatically identifying, via an automated collector service mechanism, one or more resources required for carrying out the one or more tasks by analyzing data sources comprising (i) email content, (ii) one or more source code repositories, (iii) one or more communication channels, (iv) status information pertaining to the one or more identified tasks, (v) one or more software resources, and (vi) one or more hardware resources;

automatically determining, via a delegation service mechanism, a second individual to whom the one or more tasks can be delegated, wherein said determining is based on (i) qualifications of the second individual and (ii) one or more constraints with respect to the identified resources;

automatically masking, from the second individual, any sensitive content contained within the identified resources, wherein said automatically masking comprises automatically applying one or more enterprise security-related policies pertaining to the identified resources in conjunction with automatically analyzing, via a data protection algorithm, (i) content within the identified resources and (ii) enterprise-related information pertaining to the second individual;

automatically generating a summary of the delegation, wherein the summary comprises (i) a description of the one or more tasks and (ii) one or more items of information pertaining to the given future event;

automatically outputting the summary to the second individual; and subsequent to said masking, temporarily allocating digital access to the identified resources to the second individual via a task enabler service mechanism;

wherein the steps are carried out by at least one computing device.

16. The computer-implemented method of claim 15, wherein said analyzing comprises processing the one or more inputs generated by the first individual for one or more words indicating a potential temporal conflict with the given future event.

17. The computer-implemented method of claim 15, wherein said analyzing comprises processing the stored calendar information for one or more entries indicating a potential temporal conflict with the given future event.

* * * * *